(12) United States Patent
Nakagawa (10) Patent No.: US 7,796,132 B1
(45) Date of Patent: Sep. 14, 2010

(54) IMAGE GENERATION SYSTEM AND PROGRAM

(75) Inventor: Jun Nakagawa, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 520 days.

(21) Appl. No.: 09/889,372

(22) PCT Filed: Oct. 24, 2000

(86) PCT No.: PCT/JP00/07429

§ 371 (c)(1),
(2), (4) Date: Aug. 10, 2001

(30) Foreign Application Priority Data

Nov. 18, 1999 (JP) ................................ 11-327669

(51) Int. Cl.
*G06T 15/50* (2006.01)

(52) U.S. Cl. ..................................................... 345/426

(58) Field of Classification Search ................... 345/426
See application file for complete search history.

(56) References Cited

U.S. PATENT DOCUMENTS

| | | | | |
|---|---|---|---|---|
| 5,063,375 A | * | 11/1991 | Lien et al. | 345/616 |
| 5,440,682 A | * | 8/1995 | Deering | 345/503 |
| 5,704,025 A | * | 12/1997 | Berry | 345/589 |
| 5,764,228 A | * | 6/1998 | Baldwin | 345/797 |
| 5,825,363 A | * | 10/1998 | Anderson | 345/422 |
| 5,947,823 A | * | 9/1999 | Nimura | 463/32 |
| 5,990,904 A | * | 11/1999 | Griffin | 345/631 |
| 6,038,031 A | * | 3/2000 | Murphy | 382/254 |
| 6,064,395 A | * | 5/2000 | Miura | 345/582 |
| 6,266,068 B1 | * | 7/2001 | Kang et al. | 345/629 |

(Continued)

FOREIGN PATENT DOCUMENTS

GB    2 344 039 A    5/2000

(Continued)

OTHER PUBLICATIONS

Computer Graphics: Principles and Practice. Foley et al. Addison-Wesley Publishing Company, Inc. Copyright 1996.*

(Continued)

*Primary Examiner*—Peter-Anthony Pappas
(74) *Attorney, Agent, or Firm*—Oliff & Berridge, PLC (57) ABSTRACT

An objective is to provide an image generation system and program which can overcome the problem of flickering in screen due to the appearance and disappearance of distant objects. A depth cueing processing is executed such that the color of an object being more distant from the viewpoint is made closer to the target color. At the same time, the alpha value is varied such that an object being more distant from the viewpoint is made more transparent. By drawing the most distant background including a color different from the target color, the generated images can be improved in variety. The depth cueing and alpha value varying processings are carried out on condition that the object is positioned within the depth cueing area. The depth cueing value and alpha value for each vertex in the object are varied based on a Z-value for the vertex. Objects to be varied in the alpha value are sorted such that they are drawn sequentially from an object nearest to the viewpoint. This prevents the alpha blending to be executed at an overlap area of the adjacent objects.

6 Claims, 9 Drawing Sheets

U.S. PATENT DOCUMENTS

| | | | |
|---|---|---|---|
| 6,388,671 B1 * | 5/2002 | Yoshizawa et al. | 345/505 |
| 6,734,850 B2 * | 5/2004 | Deering | 345/419 |
| 6,807,620 B1 * | 10/2004 | Suzuoki et al. | 712/2 |
| 6,891,544 B2 * | 5/2005 | Oka et al. | 345/545 |
| 2003/0011618 A1 * | 1/2003 | Deering | |

FOREIGN PATENT DOCUMENTS

| | | |
|---|---|---|
| JP | 8-7124 A | 1/1996 |
| JP | 8-161528 A | 6/1996 |
| JP | 9-81771 A | 3/1997 |
| JP | 10-214353 A | 8/1998 |
| JP | 2000-149053 A | 5/2000 |

OTHER PUBLICATIONS

Foley et al. Computer Graphics: Principles and Practice. Addison-Wesley Publishing Company, Inc. 1996. p. 165-171.*

Foley et al. Computer Graphics: Principles and Practice. Addison-Wesley Publishing Company, Inc. 1996. Color Plate II.24 and Color Plate II.25.*

Foley et al. Computer Graphics: Principles and Practice. Addison-Wesley Publishing Company, Inc. 1996. p. 237-242.*

Foley et al. Computer Graphics: Principles and Practice. Addison-Wesley Pub. Co. 1997. pp. 237-242, 253.*

Depth Cueing (fog, mist, haze, murkey water, etc.). Mar. 27, 2003. http://web.archive.org/web/20030527091433/http://www.futuretech.blinkenlights.nl/dc.html.*

Holitzer. Depth Cueing. Apr. 4, 1999. http://www.gamedev.net/reference/articles/article861.asp.*

Foley et al. Computer Graphics: Principles and Practice. Addison-Wesley Pub. Co. 1997. pp. 610, 611, 668-672.*

* cited by examiner

FIG. 3A  MOST DISTANT BACKGROUND IS BLUE SKY

FIG. 3B  MOST DISTANT BACKGROUND IS MOUNTAIN

IMAGE GENERATION SYSTEM AND PROGRAM

TECHNICAL FIELD

The present invention relates to an image generation system and program.

BACKGROUND ART

There is known an image generation system which can generate an image as viewed from a given viewpoint within a virtual three-dimensional or object space. Such a system is very popular since one can experience a so-called virtual reality through it. Now considering an image generation system for playing a racing game, a player can enjoy a three-dimensional game by controlling a motorcar (or object) for causing it to run in an object space and for causing the player's motorcar to compete against other motorcar(s) which are controlled by other players and/or computer.

In order to improve the virtual reality for a player in such an image generation system, it was an important technical problem to produce more realistic images. It is thus desired that even the image of an object in the background can more realistically be represented.

One of various known techniques for more realistically representing the image of an object in the background is a technique known as "depth cueing". This depth cueing is configured to blur an object in the background by bringing the color of the object close to a target color (e.g., gray or white) depending on the distance between the object and a viewpoint.

However, when the target color used in the depth cueing is a gray color and the most distant background (background) is blue sky, the target color (gray) of the depth cueing will be different from the color (blue) of the most distant background. Therefore, the object appearing or disappearing near a clipping position will be seen even though the depth cueing brings the color of the distant object close to the target color. This will raise a problem in that the screen flickers due to the appearance and disappearance of the distant object at the clipping position.

To overcome such a problem, the following technique may be considered. Namely, a most distant background picture having the same or substantially the same color as the target color in the depth cueing may be provided. Such a most distant background picture will always be used irrespectively of the situation of game.

However, the fixed picture will monotonize the game scene. This will raise another problem in that the feel of the player for the virtual reality cannot be improved.

DISCLOSURE OF THE INVENTION

In view of the aforementioned problems, an objective of the present invention is to provide an image generation system and program which can generate various realistic images while overcoming the problem of flickering in screen due to the appearance and disappearance of distant objects.

To this end, the present invention provides an image generation system comprising: depth cueing processing means which performs processing for depth cueing for an object such that the color of the object being more distant from a viewpoint is made closer to a target color; alpha value processing means which performs processing for varying an alpha ($\alpha$) value of the object so that the object being more distant from the viewpoint becomes more transparent; and drawing means which draws an image viewable from a virtual camera in an object space. A computer-usable information storage medium according to the present invention comprises a program for implementing the aforementioned means. According to the present invention, there is provided a computer-usable program (including a program embodied in a carrier wave) comprising a processing routine for implementing the aforementioned means.

According to the present invention, the color of an object (including one or more primitive surfaces) being more distant from the viewpoint can be made closer to the target color and more transparent. Therefore, a player would not feel the appearance and disappearance of distant objects. Thus, the problem of flickering in screen can be overcome.

The depth cueing processing and the varying processing of the alpha value (i.e., transparency, translucency or opacity) may be carried out based on a Z-value of an object or based on the distance (in a straight line, for example) between the viewpoint (i.e., virtual camera, screen or moving object) and an object. The depth cueing process can be performed by any of various known methods.

In the image generation system, information storage medium and program according to the present invention, the drawing means may draw a most distant background including a color different from the target color. This makes it possible to draw various types of a most distant background to improve the variety in generated images.

In the image generation system, information storage medium and program according to the present invention, the depth cueing processing means may perform depth cueing for the object on condition that the object is positioned within a given area; and the alpha value processing means may perform processing for varying the alpha value on condition that the object is positioned within a given area. This makes it possible to reduce the processing load since objects out of a given area do not require the depth cueing and alpha value varying processing.

In the image generation system, information storage medium and program according to the present invention, the depth cueing processing means may vary a depth cueing value for each vertex of the object based on a Z-value for each vertex of the object; and the alpha value processing means may vary the alpha value for each vertex of the object based on the Z-value for each vertex of the object. This enables more accurate depth cueing and alpha value control.

The image generation system, information storage medium or program according to the present invention may further comprise sorting means which sorts objects of which alpha values are varied and causes the objects to be drawn sequentially from an object nearest to the viewpoint, or a program or processing routine for implementing this sorting means.

According to another aspect of the present invention, there is provided an image generation system comprising: alpha value processing means which performs processing for varying an alpha ($\alpha$) value of an object so that the object being more distant from the viewpoint becomes more transparent; and drawing means which draws an image viewable from a virtual camera within an object space. The present invention further provides a computer-usable information storage medium comprising a program for implementing the aforementioned means. The present invention still further provides a computer-usable program (including a program embodied in a carrier wave) comprising a processing routine for implementing the aforementioned means.

According to the present invention, an object being more distant from the viewpoint can be made more transparent.

Therefore, the player would not feel the appearance and disappearance of distant objects. Thus, the problem of flickering in screen can be overcome.

According to further aspect of the present invention, there is provided an image generation system comprising: alpha value processing means which performs processing for varying an alpha (α) value of an object depending on the distance between the object and the viewpoint; sorting means which sorts objects of which alpha values are varied and causes the objects to be drawn sequentially from an object nearest to the viewpoint; and drawing means which draws an image viewable from a virtual camera in an object space in drawing order determined by the sorting means while performing alpha blending based on the alpha value. The present invention further provides a computer-usable information storage medium comprising a program for implementing the aforementioned means. The present invention still further provides a computer-usable program (including a program embodied in a carrier wave) comprising a processing routine for implementing the aforementioned means.

According to the present invention, the objects of which alpha values are varied are drawn sequentially from an object nearest to the viewpoint. Therefore, alpha blending can be prevented from occurring in an overlap area between the objects to be varied in alpha value. This makes it possible to generate more natural images. The most distant background can be drawn prior to the drawing of the objects to be varied in alpha value. The drawing means may perform the hidden-surface removal according to the Z-buffer method.

BEST MODES FOR CARRYING OUT THE INVENTION

Preferred embodiments of the present invention will now be described with reference to the drawings. Although the present invention will be described in connection with a racing game, it is not limited to such a racing game, but may be applied to any of various other games.

1. Arrangement

Figure 1:
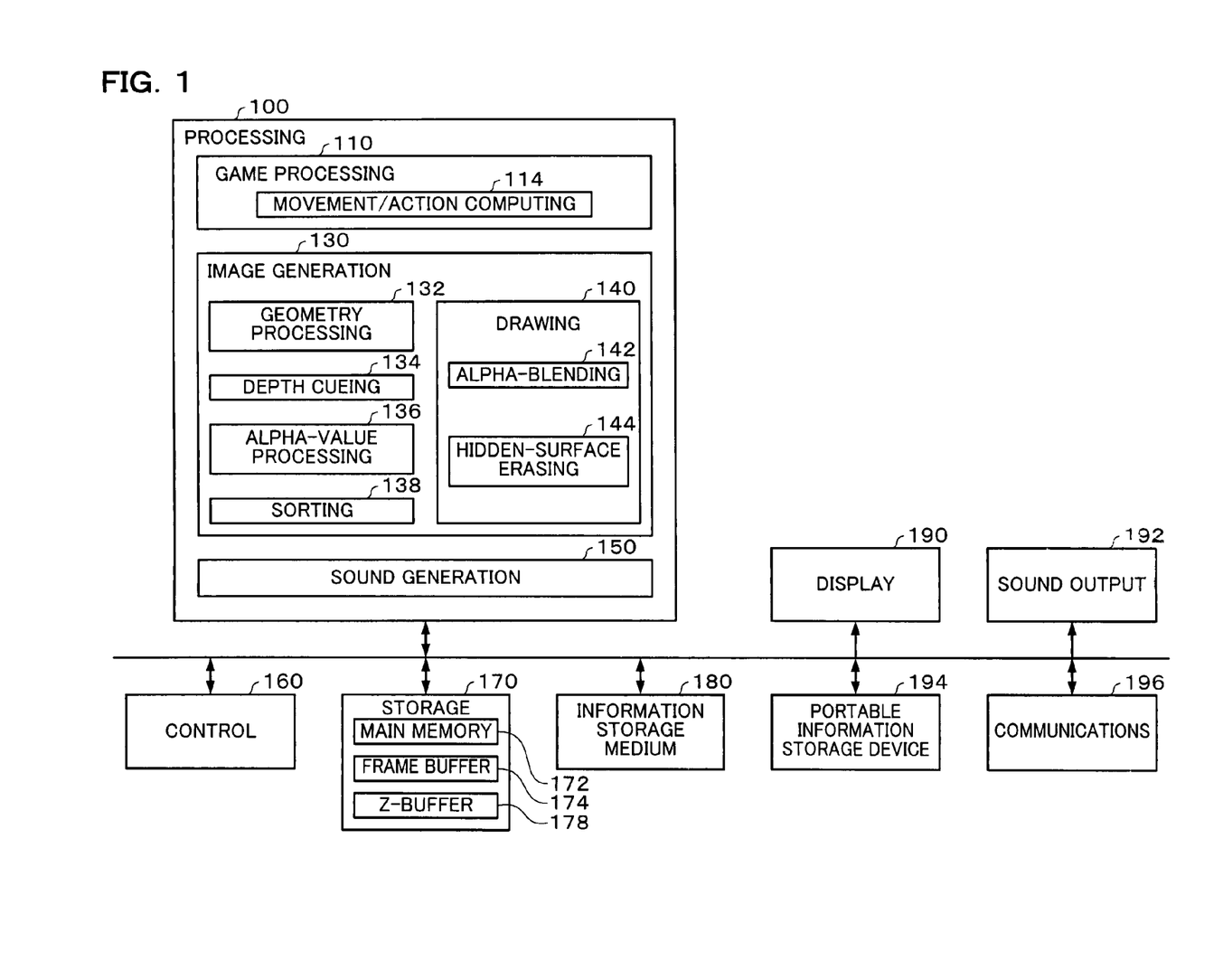
FIG. 1 is a block diagram of the embodiment of an image generation system according to the present invention.

FIG. 1 shows a block diagram of this embodiment. In this figure, this embodiment may comprise at least a processing section 100 (or a processing section 100 with a storage section 170 or a processing section 100 with a storage section 170 and an information storage medium 180). Each of the other blocks (e.g., control section 160, display section 190, sound output section 192, portable information storage device 194 and communications section 196) may take any suitable form.

The processing section 100 is designed to perform various processings for control of the entire system, commands to the respective blocks in the system, game processing, sound processing and so on. The function thereof may be implemented through various processors (CPU, DSP and the like) or through hardware such as ASIC (gate array or the like) or through a given program (game program).

The control section 160 is used to input operational data from the player and the function thereof may be implemented through hardware including levers, buttons, housing or the like.

The storage section 170 provides a working area for the processing section 100, communications section 196 and others. The function thereof may be implemented by hardware such as RAM or the like.

The information storage medium (which may be a computer-readable storage medium) 180 is designed to store information including programs, data and others. The function thereof may be implemented through hardware such as an optical memory disk (CD or DVD), a magneto-optical disk (MO), a magnetic disk, a hard disk, a magnetic tape, a memory (ROM) or the like. The processing section 100 performs various processings in the present invention (or this embodiment) based on the information that have been stored in this information storage medium 180. In other words, the information storage medium 180 stores various pieces of information (or programs or data) for executing the means (particularly, the blocks included in the processing section 100) of the present invention (or this embodiment).

Part or the whole of the information stored in the information storage medium 180 will be transferred to the storage section 140 when the system is initially powered on. The information stored in the information storage medium 180 may contain at least one of program code set, image data, sound data, object shape data, table data, list data, information for instructing the processings in the present invention, information for performing the processings according to the instructions and so on.

The display section 190 outputs images generated according to this embodiment. The function thereof may be implemented through hardware such as CRT, LCD, HMD (Head Mount Display) or the like.

The sound output section 192 outputs sounds generated according to this embodiment. The function thereof may be implemented by hardware such as a speaker or the like.

The portable information storage device 194 is to store player's personal data, saved data and the like and may include a memory card, a portable game device or the like.

The communications section 196 is designed to perform various controls for communication between the game system and any external device (e.g., a host machine or other image generation systems). The function thereof may be implemented through any of various processors, hardware means such as communication ASIS or the like or a program.

Programs or data for executing the means in the present invention (or this embodiment) may be delivered from an information storage medium included in a host machine (or server) to the information storage medium 180 through a network and the communications section 196. The use of such an information storage medium in the host machine (or server) falls within the scope of the invention.

The processing section 100 further comprises a game processing section 110, an image generation section 130 and a sound generation section 150.

The game processing section 110 is designed to perform various processes such as coin (or charge) reception, setting of various modes, game proceeding, setting of scene selection, determination of the position and rotation angle (about X-, Y- or Z-axis) of an object (including one or more primitive surfaces), moving the object (motion processing), determination of viewpoint (virtual camera) and angle of visual line (rotational angle of the virtual camera), arrangement of an object such as a mapped object within the object space, hit checking, computation of the game results (or scores), processing for causing a plurality of players to play in a common game space, various game computations including game-over and other processes, based on operational data from the control section 160 and according to the data and personal data, saved data, game program and the like from the portable information storage device 194.

The game processing section 110 includes a movement/action computing section 114.

The movement/action computing section 114 computes movement information (positional data and rotational angle data) for objects such as motorcars and the like and action (motion) information (positional data and rotational angle data for each parts in objects). For example, the movement/action computing section 114 may cause an object to move and/or act based on operational data inputted by a player through the control section 160.

More particularly, the movement/action computing section 114 determines the position and rotational angle of an object, for example, for each frame (for each 1/60 seconds). For example it is now assumed that the position of an object for (k−1) frame is $PM_{k-1}$, its speed is $VM_{k-1}$, its acceleration $Am_{k-1}$, and one frame time is $\Delta t$. The position $PM_k$ and speed $VM_k$ of that object for k frame may be determined, for example, by the following formulas (1) and (2):

$$PM_k = PM_{k-1} + VM_{k-1} \times \Delta t \quad (1)$$

$$VM_k = VM_{k-1} + AM_{k-1} \times \Delta t \quad (2)$$

The image generation section 130 is to perform various image processings according to instructions from the game processing section 110. For example, the game processing section 110 may generate an image viewable from a virtual camera (or viewpoint) within an object space, the generated images being then outputted toward the display section 190. The sound generation section 150 is to perform various sound processings according to instructions from the game processing section 110 to generate BGM, sound effects, voice which are in turn outputted toward the sound output section 192.

All the functions of the game processing section 110, image generation section 130 and sound generation section 150 may be implemented through hardware and/or programs.

The image generation section 130 comprises a geometry processing section (or three-dimensional coordinates computing section) 132, a depth cueing section 134, an alpha value processing section 136, a sorting section 138 and a drawing section (or rendering section) 140.

The geometry processing section 132 performs various geometry processings (or three-dimensional computations) such as coordinate transformation, clipping, perspective transformation, light-source computation and so on. Object data after the geometry processing (or perspective transformation) are saved in a main memory 172 of the storage section 170. Such object data may include shape data such as vertex coordinates in the object, vertex texture coordinates, brightness data and so on.

The depth cueing section 134 performs the depth cueing so that the color of an object (including one or more primitive surfaces) is brought closer to a target color as the object is more distant from a viewpoint. Thus, with a gray target color, for example, the color of a distant object may be brought close to gray color irrespectively of the original color thereof. The depth cueing process is controlled by using a depth cueing value which is a parameter for determining the strength of the depth cueing effect.

The alpha value processing section 136 performs the processing for varying the alpha value (transparency, translucency or opacity) of objects so that an object being more distant from the viewpoint will be more transparent. Thus, an object which has been opaque in the foreground will be made more transparent in the background. As a result, the problem of flickering in screen due to the appearance and disappearance of the distant object at the clipping position can be overcome.

The sorting section 138 performs the sorting so that objects to be varied in alpha value (within a depth cueing range) will be drawn sequentially from an object nearest to the viewpoint.

The drawing section 140 is to draw an image viewable from the virtual camera in the object space, based on object data and texture. In this case, the drawing section 140 draws objects in drawing order determined by the sorting section 138.

The drawing section 140 includes an alpha ($\alpha$) blending section (or translucency processing section) 142 and a hidden-surface erasing section 144.

The alpha blending section 142 performs such alpha blending (translucency processing) process as shown by the following formulas, based on the alpha value of the object.

$$R_Q = (1-\alpha) \times R_1 + \alpha \times R_2 \quad (3)$$

$$G_Q = (1-\alpha) \times G_1 + \alpha \times G_2 \quad (4)$$

$$B_Q = (1-\alpha) \times B_1 + \alpha \times B_2 \quad (5)$$

In the above formulas, $R_Q$, $G_Q$ and $B_Q$ are R, G and B components in the color (brightness) of an original image which has already been drawn in a frame buffer 174, and $R_2$, $G_2$ and $B_2$ are R, G and B color components of an image over-drawn on the original image.

The hidden-surface erasing section 144 performs the hidden-surface erasing according to the Z-buffer process algorism by using a Z-buffer 178 in which the depth value is stored.

The image generation system of this embodiment may be dedicated for a single-player mode in which only a single player can play the game or may have a multi-player mode in which a plurality of players can play the game.

If a plurality of players make a game play, only a single terminal may be used to generate game images and sounds to be provided to all the players. Alternatively, a plurality of terminals interconnected through a network (transmission lien or communication line) may be used.

2. Features of this Embodiment

Figure 2:
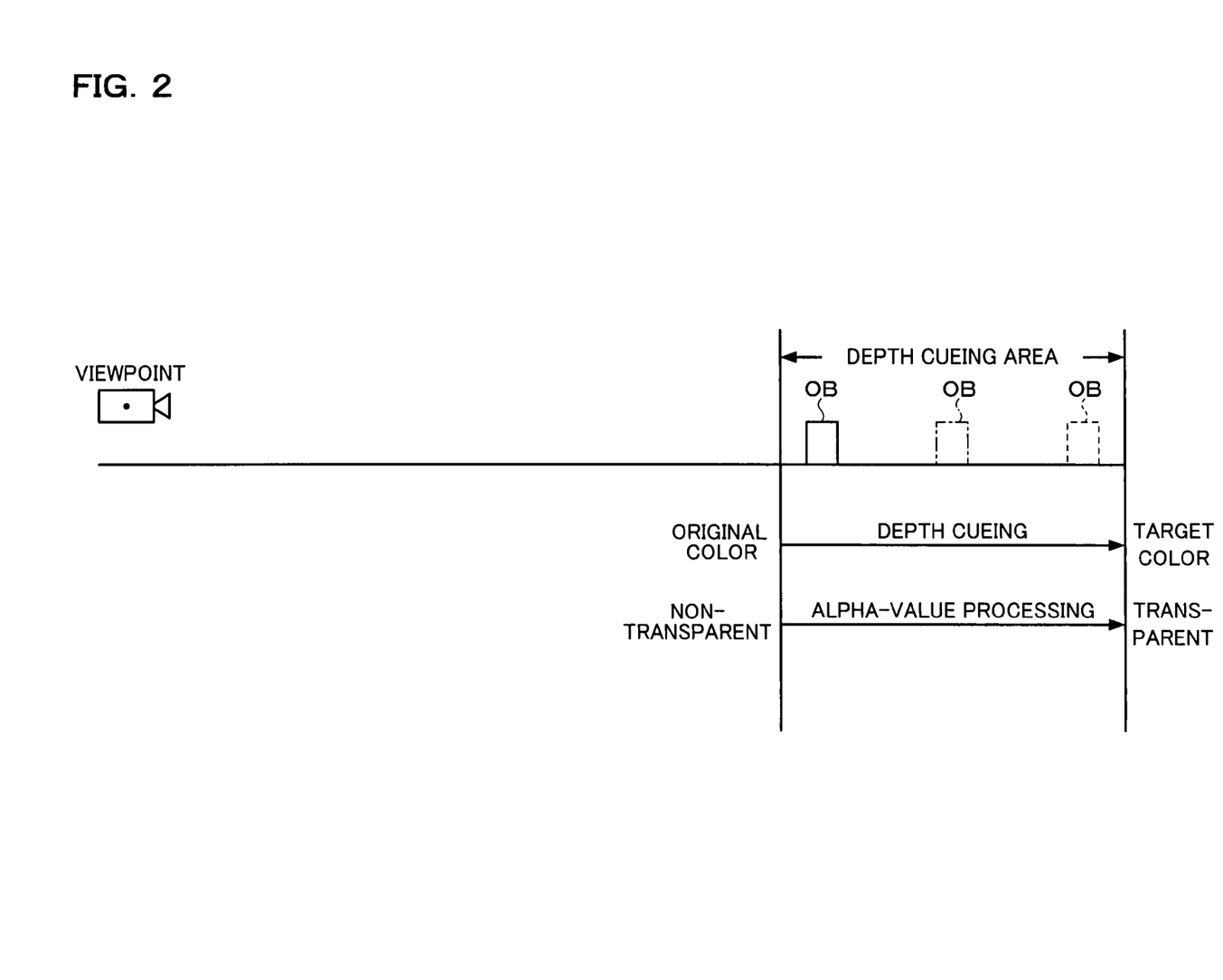
FIG. 2 is illustrative of a technique of making an object being more distant from a viewpoint more transparent as well as making the color of the object closer to a target color.

As shown in FIG. 2, this embodiment performs the depth cueing process such that the color of an object OB (including one or more polygons) will be brought closer to a target color as the object is more distant from a viewpoint (a virtual camera, a screen or a moving object manipulated by a player). Thus, if the object OB is nearer to the viewpoint, the color of the object remains originally. However, if the object is more distant from the viewpoint, the color thereof will be brought closer to the target color.

As shown in FIG. 2, this embodiment also performs the alpha value varying process such that the object OB will be made more transparent as it is more distant from the viewpoint. Thus, the object OB remains opaque if it is nearer to the viewpoint and is gradually made more transparent as the object OB is more distant from the viewpoint.

Therefore, the player would not feel the appearance and disappearance of the object at a point near the clipping position (or the backward clipping plane of the viewing volume). Thus, the problem of flickering in screen can be overcome.

Figure 3A:
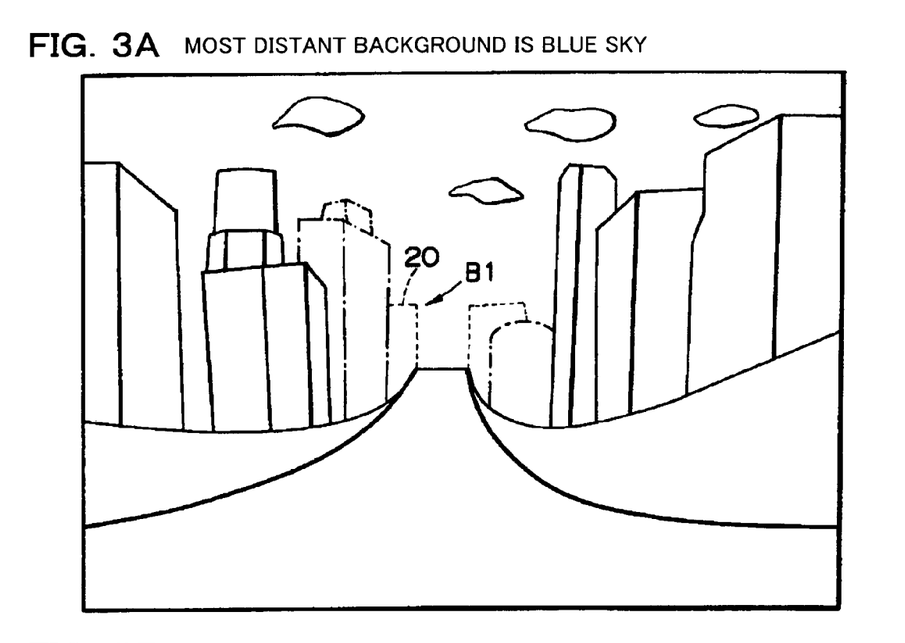
FIGS. 3A and 3B show game image examples generated according to the embodiment of the present invention.
Figure 3B:
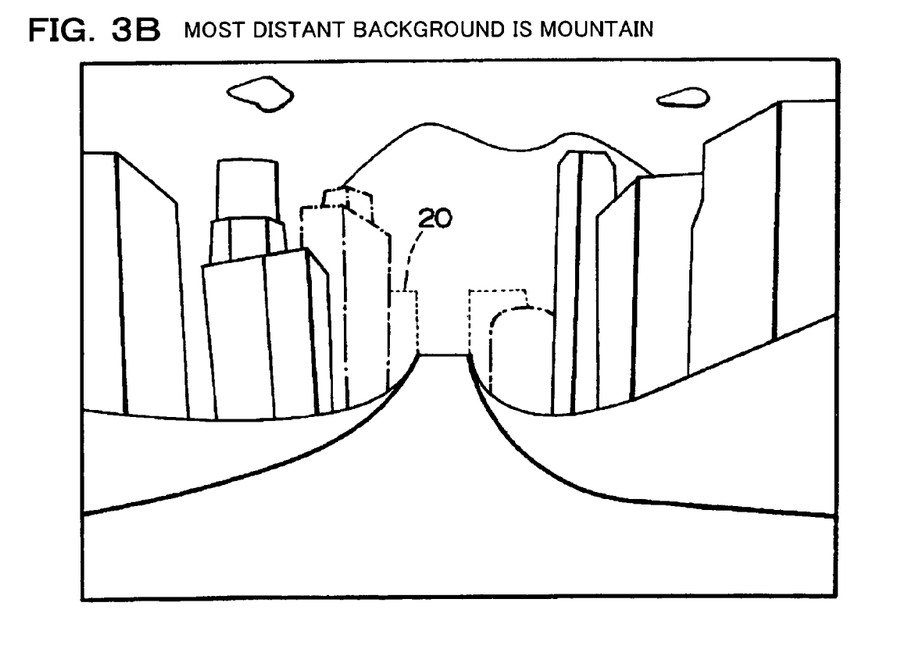

FIGS. 3A and 3B show game images generated according to this embodiment.

Referring to FIG. 3A, the most distant background is blue sky with the color thereof being blue. In this case, the gray-color outline of a building 20 can be viewed in the blue sky of the most distant background even though the color of the building 20 in the background is brought close to a target color (e.g., gray color) through the depth cueing. Thus, the sudden appearance and disappearance of the building 20 will be seen by the player, resulting in flickering in the screen near to B1 of FIG. 3A.

In addition to the depth cueing process for bringing the color of the building 20 closer to the target color, this embodiment also performs the alpha value varying process for making the building 20 of the background transparent. Therefore, the gray-color outline of the building 20 will not remain in the blue sky of the most distant background. This can overcome the problem of flickering in screen.

There may be considered a technique different from that of this embodiment. In this technique, independent of the game situation, only a most distant background drawn with the same color as the target color of the depth cueing is used. As shown in FIG. 3A, for example, the target color of the depth cueing may be blue while the most distant background may be fixed to a blue sky. Thus, the blue-color outline of the building 20 in the background will be indistinctive. Therefore, the problem of flickering in screen can be overcome to some extent.

According to this technique, however, the most distant background is always a blue sky independent of the position of a car in the course, so that the game images become monotonous.

On the contrary, this embodiment will not create any problem of flickering in screen even if the most distant background drawn with a color different from the target color is used. As shown in FIGS. 3A and 3B, for example, various pictures such as blue sky, mountain or the like can be used as the most distant background. As a result, the game images generated can highly be improved in variety and reality.

It is now assumed that the target color of the depth cueing is gray color, for example. In this case, this embodiment can ultimately vanish the outline of the building 20 even though the most distant background is a blue sky as shown in FIG. 3A or a mountain as shown in FIG. 3B, since the building 20 is made transparent by varying the alpha value. Therefore, the distant building 20 will be merged into the most distant background irrespectively of the color of the most distant background. This prevents the screen from being flickered.

As shown in FIG. 2, this embodiment performs the depth cueing and alpha value processing only for an object which is within the depth cueing range (or a given range). In other words, only under a condition that an object is within the depth cueing range, the depth cueing value thereof is varied and the alpha value thereof is also varied. Thus, the processing load can be reduced since the processings relating to the depth cueing and alpha value will not be carried out for the object which is outside the depth cueing range. For an object which is out of the depth cueing range, the problem of flickering in screen will not be raised even though the processings relating to the depth cueing and alpha value are not carried out.

More particularly, the processings relating to the depth cueing and alpha value are executed in the following manner.

Figure 4:
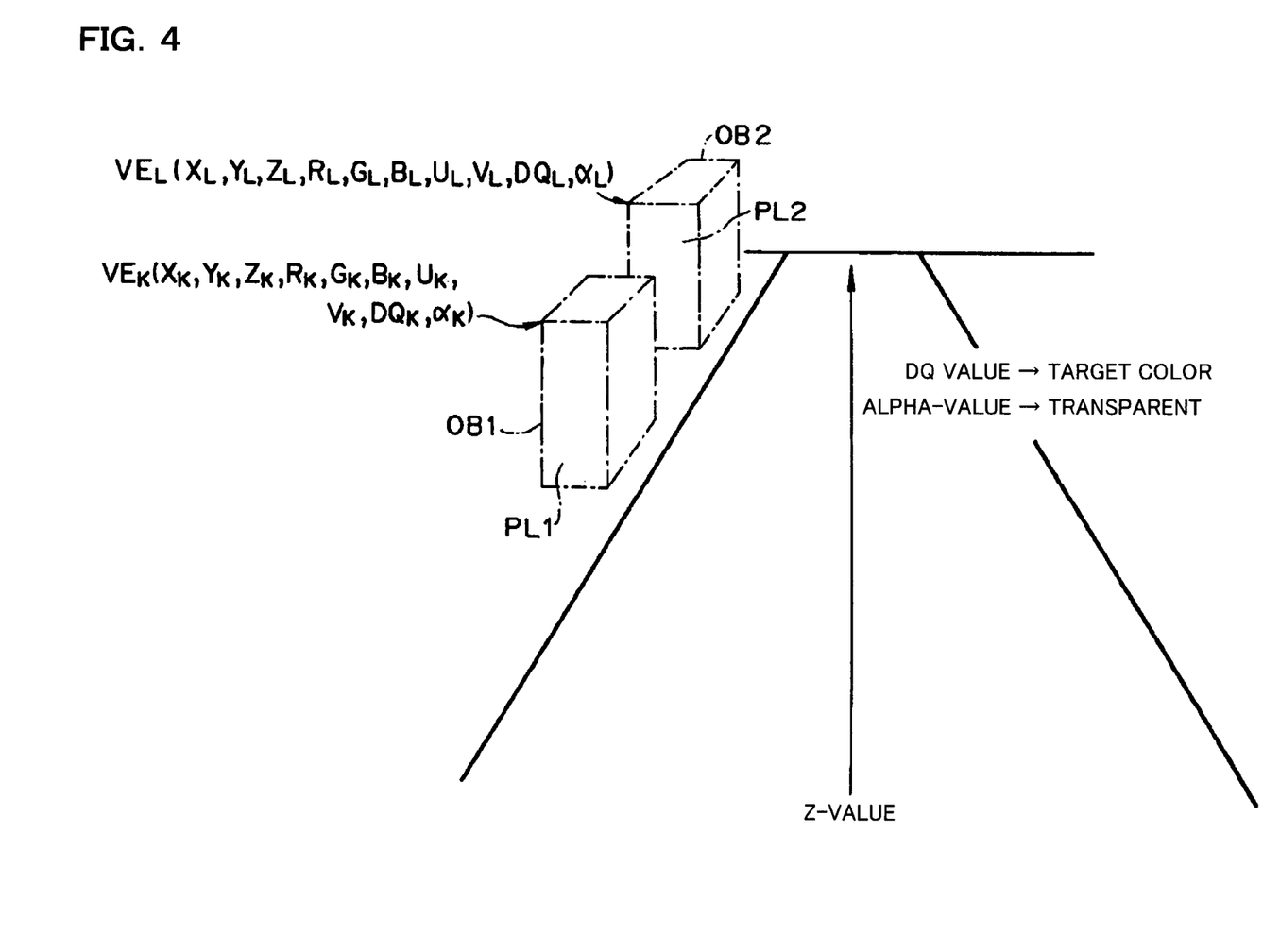
FIG. 4 is illustrative of a technique of varying the depth cueing value and alpha value for a vertex in an object, based on a Z-value for the vertex.

As shown in FIG. 4, for example, a vertex $VE_K$ of an object OB1 (or polygon PL1) includes various factors set thereto, such as vertex coordinates $(X_K, Y_K, Z_K)$, color (brightness) information $(R_K, G_K, B_K)$, texture coordinates $(U_K, V_K)$, depth cueing value $DQ_K$, alpha value $\alpha_K$ and so on. Similarly, a vertex $VE_L$ of another object OB2 (or polygon PL2) includes various factors set thereto, such as vertex coordinates $(X_L, Y_L, Z_L)$, color (brightness) information $(R_L, G_L, E_L)$, texture coordinates $(U_L, V_L)$, depth cueing value $DQ_L$, alpha value $\alpha_L$ and so on. In this embodiment, information for each pixel is determined through interpolation based on the information given to these vertexes.

This embodiment causes the DQ (depth cueing) value set at each vertex in each object to vary based on the Z-value for that vertex (just the Z coordinate therein or a value determined from the Z coordinate by a given calculation). Based on such a Z-value, the alpha value set at that vertex is also varied. It is now assumed that the Z-value increases as being more distant from the screen; the depth cueing effect increases as the DQ value increases; and the object is made more transparent as the alpha value decreases. In such a case, the DQ value is increased to bring the color of the object closer to the target color as the Z-value increases. At the same time, the alpha value is decreased to make the object more transparent. Thus, the $DQ_L$ of the vertex $VE_L$ of the object OB2 shown in FIG. 4 becomes larger than the $DQ_K$ of the vertex $VE_K$ of the object OB1 while the $\alpha_L$ of the vertex $VE_L$ becomes smaller than the $\alpha_K$ of the vertex $VE_K$. As a result, the object OB2 will have its color brought closer to the target color and will be made more transparent than the object OB1.

With the DQ values and alpha values of the vertexes being varied based on the Z-values thereof in such a manner, these values will be different from one another even in the same object (polygon). Therefore, the depth cueing and alpha value can more accurately be controlled.

The image generation system as according to this embodiment requires the hidden-surface erasing in which a portion not viewable from the viewpoint is erased while another viewable portion is only displayed. The typical hidden-surface erasing process is known as a depth sorting process or a Z-buffer process.

The depth sorting (Z sorting) process sorts objects based on their distances from the viewpoint and draws the objects sequentially from an object farthest from the viewpoint. On the other hand, the Z-buffer process provides a Z-buffer for storing depth values for all the pixels (dots) on the screen and then uses it to perform the hidden-surface erasing.

The Z-buffer process judges the back-and-forth relationship between the pixels based on the depth values which have been stored in the Z-buffer. If the hidden-surface erasing is to be carried out according to the Z-buffer process, therefore, the drawing order of objects is not essentially required to be considered. Thus, the objects can be drawn in any order.

If the alpha blending is to be performed by using the alpha values, however, the drawing order of objects must be modified even when the hidden-surface erasing is carried out according to the Z-buffer process.

Figure 5A:
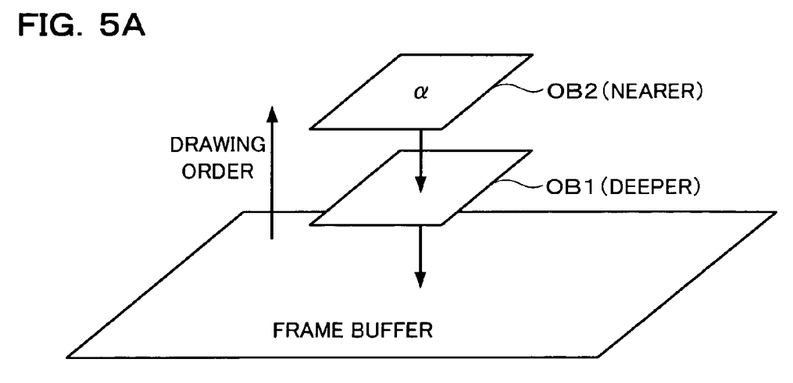
FIGS. 5A, 5B and 5C are illustrative of a drawing order for objects in alpha blending.
Figure 5B:
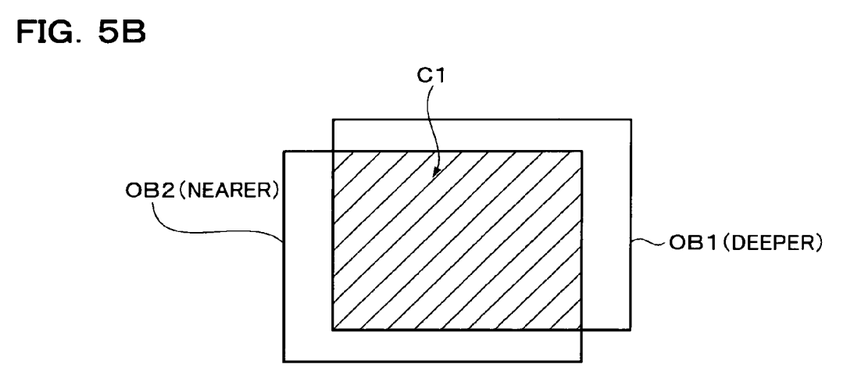

As shown in FIG. 5A, for example, it is now assumed that the alpha blending relating to both the object OB1 deeper from the viewpoint and the other object OB2 less deep from the viewpoint is carried out based on the alpha value set for the object OB2. In this case, the drawing must be carried out in such order that the object OB1 is first drawn in the frame buffer and then over-written by the object OB2. Thus, the color information of the objects OB1 and OB2 will properly be alpha-blended at a portion C1 of FIG. 5B, so that the deeper object OB1 can be viewable through the object OB2.

Figure 5C:
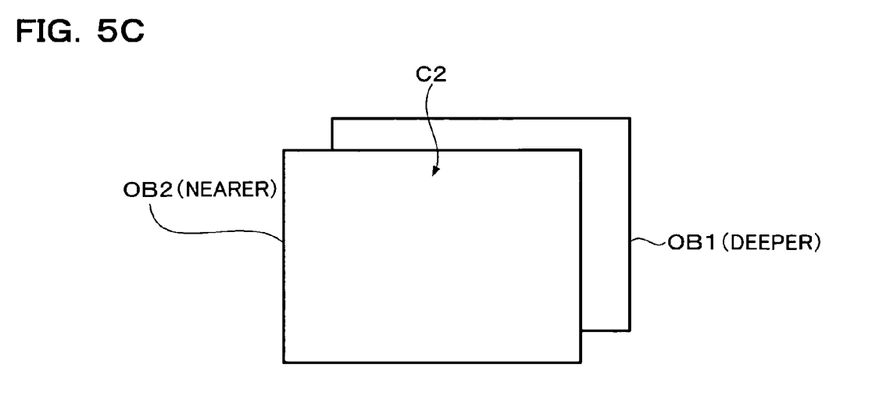

On the contrary, if the objects OB1 and OB2 are drawn in inverse order to that of FIG. 5A, such an image as shown in FIG. 5C will be drawn. In other words, if the object OB2 is drawn prior to the object OB1, the alpha blending for the objects OB1 and OB2 based on the alpha value set for OB2 will not be performed. As a result, the deeper object OB1 will fully be hidden by the less deep object OB2 at a portion C2 of FIG. 5C. Namely, the normal hidden-surface erasing process will be carried out on the judgment that the object OB2 is not transparent.

As described, the alpha blending process using the alpha value requires to draw the objects sequentially from an object most distant from the viewpoint.

In the technique of FIG. 2 which performs the alpha blending for making the deeper object more transparent, however, it has been found that the following problem is raised if the objects having their set alpha values are drawn sequentially from an object most distant from the viewpoint.

Figure 6A:
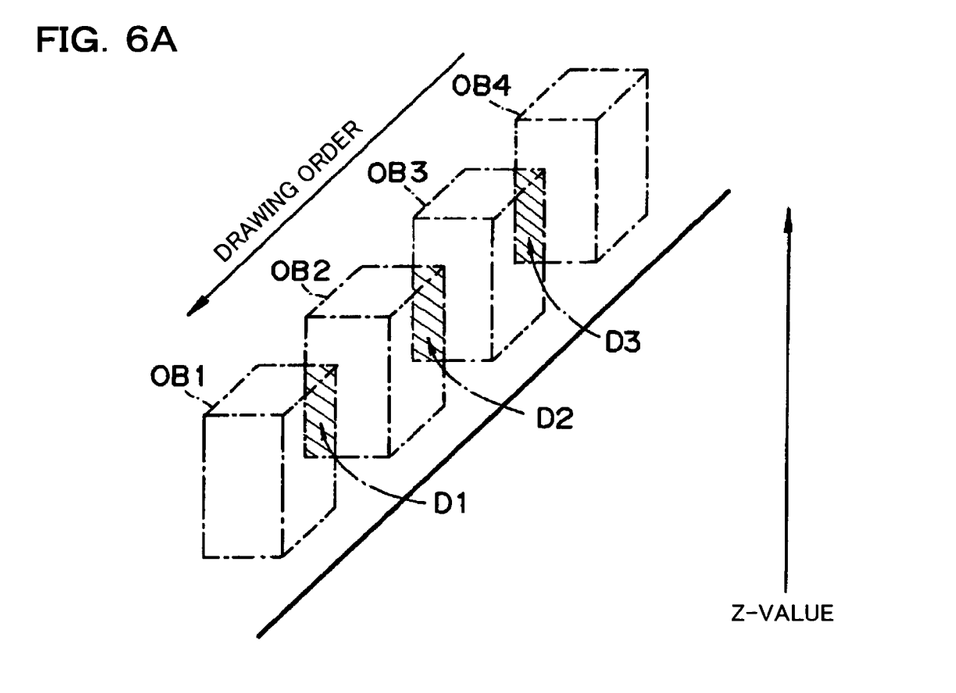
FIGS. 6A and 6B are illustrative of a technique of drawing objects to be varied in alpha value sequentially from an object nearest to the viewpoint.

In FIG. 6A, for example, objects OB1 to OB 4 are to be varied in alpha value according to the technique of FIG. 2. The object OB1 is nearer to the viewpoint while the object OB4 is deepest from the viewpoint. In this case, if the objects OB4, OB3, OB2 and OB1 are drawn in the described order as in FIG. 5A, any deeper object will be viewable through another nearer object at each of D1, D2 and D3. For example, at D1, the nearer and deeper objects OB1, OB2 will be alpha-blended so that the deeper object OB2 is viewable through the nearer object OB1. Similarly, the object OB3 or OB4 will be viewable at D2 or D3. The resulting picture is not natural.

The purpose of varying the alpha value so that an object being more distant from the viewpoint is made more transparent in FIG. 2 is to naturally merge the distant object into the most distant background, but not to perform the alpha blending between the objects. However, if the objects to be varied in alpha value overlap one over another, the deeper object images will be viewable through the nearer object images to degrade the reality thereof, as shown by D1, D2, D3 in FIG. 6A.

Figure 6B:
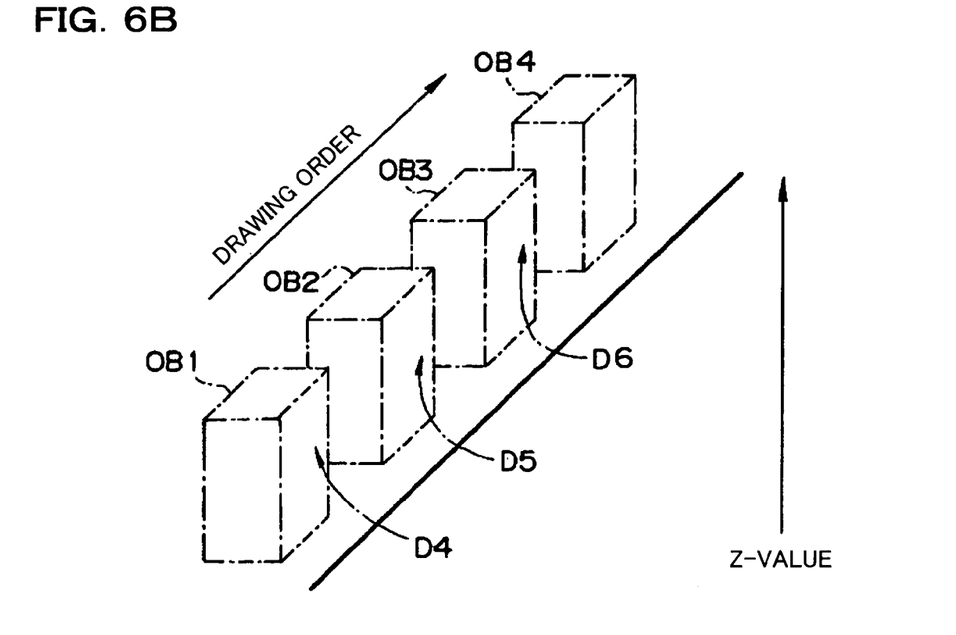

In view of this, this embodiment sorts the objects of which alpha values are varied according to the technique of FIG. 2 (or the objects within the depth cueing range) to draw them sequentially from an object nearest to the viewpoint. In other words, as shown in FIG. 6B, the objects OB1 to OB4 to be varied in alpha value will be drawn in order of OB1, OB2, OB3 and OB4. Thus, at D4, D5 and D6, the alpha blending will not be carried out between the nearer and deeper objects. Therefore, the nearer object will be over-written by the deeper object according to the hidden-surface erasing such as Z-buffer process (see FIG. 5C). Thus, the deeper object will not be viewable through the nearer object. More particularly, the image of the object OB2 will be hidden by the nearer object OB1 at D4; OB3 will be hidden by OB2 at D5; and OB4 will be hidden by OB3 at D6. Unlike FIG. 6A, thus, more natural images can be generated.

If the objects OB1 to OB4 are drawn in order as shown in FIG. 6B, the alpha blending can be carried out between each of the objects OB1-OB4 and the most distant background by drawing the most distant background initially. The farthest object will thus be merged into the background. This can overcome the problem of flickering in screen.

3. Processing in this Embodiment

Figure 7:
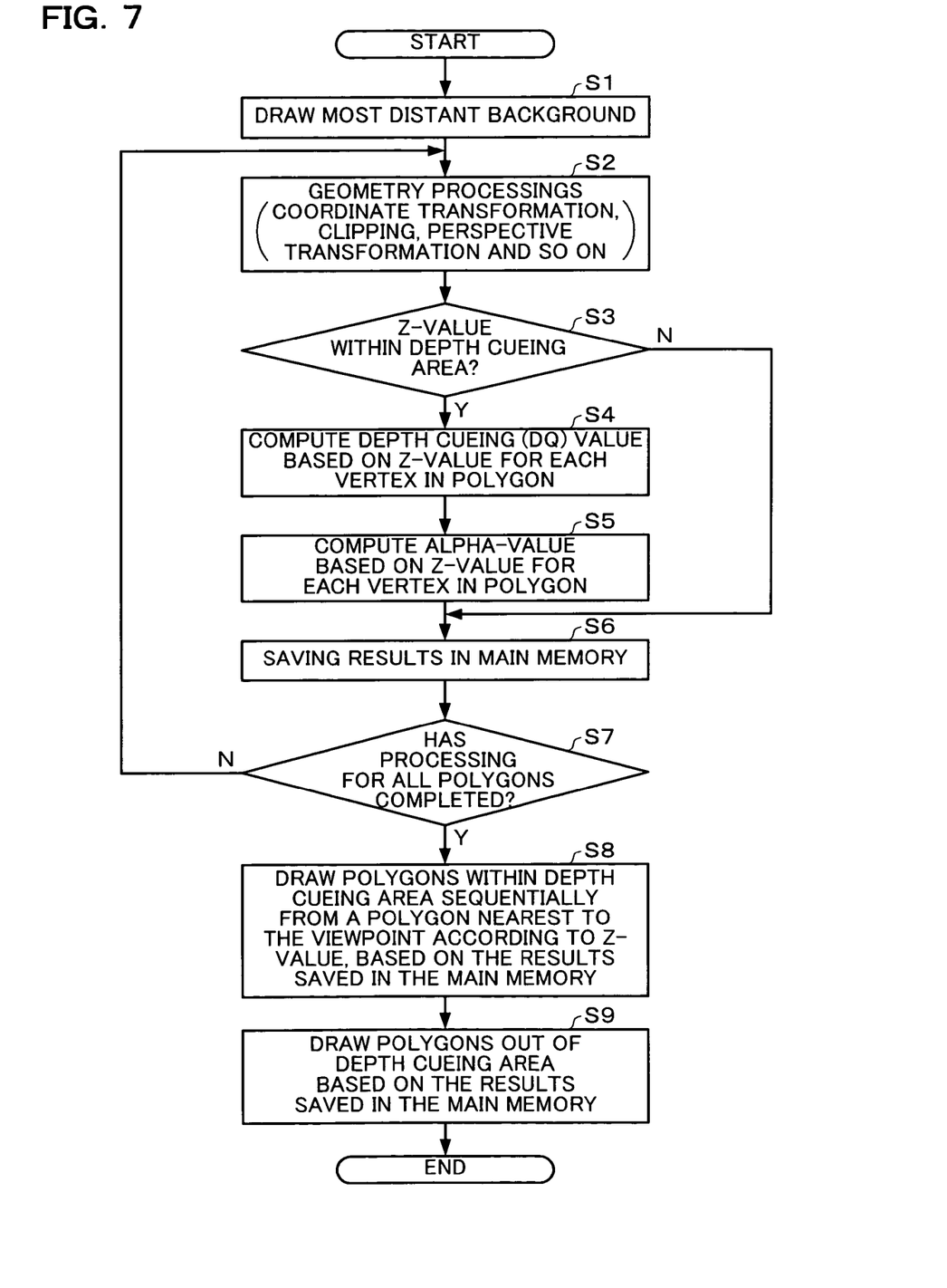
FIG. 7 is a flowchart illustrating details of the process according to the embodiment of the present invention.

The details of the processing according to this embodiment will be described with reference to the flowchart of FIG. 7.

The most distant background is initially drawn in the frame buffer (step S1). For example, the picture of blue sky may be drawn in FIG. 3A and the picture of mountain may be drawn in FIG. 3B. As previously described, this embodiment can draw the most distant background by using a color different from the target color of the depth cueing. The generated images can be increased in variety. With initially drawing the most distant background, the alpha blending between each of the objects and the most distant background can be realized even though the objects to be varied in alpha value are drawn in drawing order as shown in FIG. 6B.

Next, polygons (or objects in a broad sense) are then subjected to the geometry processing (step S2). More particularly, the coordinate transformation may be performed from the local coordinate system to the world coordinate system and from the world coordinate system to the viewpoint coordinate system. The clipping or perspective transformation to the screen coordinate system may be carried out.

It is then judged whether or not the Z-value is within the depth cueing range (see FIG. 2) (step S3). If the Z-value is within the depth cueing range, DQ value (or depth cueing value) for a vertex in a polygon is computed based on the Z-value of that vertex (step S4), as described in connection with FIG. 4. In other words, the DQ value is varied such that the color of the vertex will be brought closer to the target color as the vertex is farther from the viewpoint. The alpha value of that vertex is also computed based on the Z-value thereof (step S5). In other words, the alpha value is also varied such that the vertex is made more transparent as it is farther from the viewpoint.

On the other hand, if the Z-value is out of the depth cueing range, the steps S4 and S5 are omitted. Thus, the processing load can be reduced.

The results of computation (from geometry processing, DQ computation, alpha value computation and so on) are then saved in the main memory (step S6).

It is then judged whether or not the processing for all the polygons has completed (step S7). If not so, the procedure returns to the step S2. If so, the polygons within the depth cueing area are drawn sequentially from a polygon nearest to the viewpoint according to the Z-value, based on the results saved in the main memory (step S8). By drawing the objects in such drawing order, it can be prevented that the deeper object becomes viewable through the nearer object at the overlap between the objects, as described in connection with FIG. 6B.

Finally, the polygons out of the depth cueing range are drawn based on the results saved in the main memory (step S9). This completes the drawing process for one frame.

4. Hardware Configuration

Figure 8:
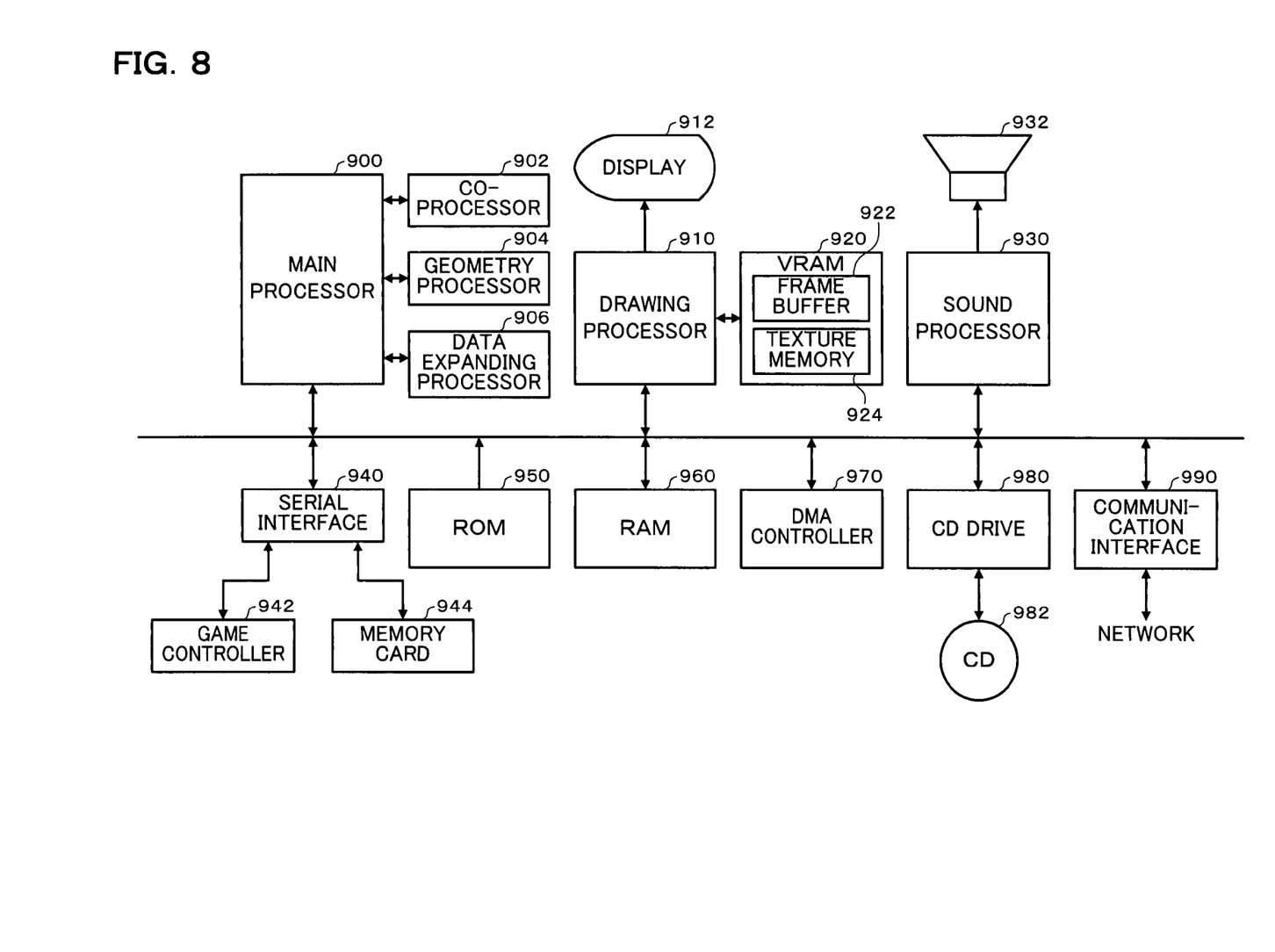
FIG. 8 shows an example of hardware configuration for implementing the embodiment of the present invention.

An example of hardware configuration for implementing this embodiment is now described with reference to FIG. 8.

A main processor 900 operates to perform various processings relating to game, image and sound, based on a program stored in CD 982 (or information storage medium) or a program transferred through a communication interface 990 or a program stored in ROM 950 (which is one of the information storage media).

A co-processor 902 assists the processings of the main processor 900 and has a sum-of-product computing section and division computing section which can a high-speed parallel computation such that a matrix computation (or vector computation) will be carried out at high speed. For example, if a physical simulation for causing the objects to perform the movement and action thereof requires the matrix computation, the program running on the main processor 900 instructs or invites its processing to the co-processor 902.

A geometry processor 904 performs various geometry processes such as coordinate transformation, perspective transformation, light-source computation, curve generation and so on. The geometry processor 904 has a sum-of-product computing section and division computing section which can a high-speed parallel computation such that a matrix computation (or vector computation) will be carried out at high speed. For example, if various processings such as coordinate transformation, perspective transformation, light-source computation and so on are to be carried out, the program running on the main processor 900 instructs the processing thereof to the geometry processor 904.

A data expanding processor 906 performs a decode processing for expanding compressed image and sound data or to perform a processing for accelerating the decode processing in the main processor 900. Thus, dynamic images compressed through MPEG system or the like can be displayed in opening, intermission, ending, game or other scenes. The image and sound to be processed through the decode processing are stored in ROM 950 and CD 982 or externally transferred through a communication interface 990.

A drawing processor 910 draws (or renders) objects formed by primitive surfaces such as polygons and curved faces at high speed. On drawing the objects, the main processor 900 delivers object data to the drawing processor 910 utilizing the function of a DMA controller 970 and also transfers textures to a texture memory 924, if necessary. Thus, the drawing processor 910 draws the objects in a frame buffer 922 at high speed while erasing hidden surfaces through the Z buffer or the like, based on these objects and textures. The drawing processor can further perform any other processing such as alpha blending (or translucence processing), depth cueing, mip-mapping, fogging, tri-linear filtering, anti-aliasing, shading or the like. As the images for one frame have been written into the frame buffer 922, a picture will be displayed on a display 912.

A sound processor 930 includes a multi-channel adaptive differential pulse code modulation (ADPCM) sound source or the like and generates high-quality game sounds such as BGM, sound effect, voice and so on. The generated game sounds are outputted through a speaker 932.

Operational data from a game controller 942 and saved and personal data from a memory card 944 are transferred through a serial interface 940.

ROM 950 has stored a system program and so on. With an arcade game system, the ROM 950 functions as an information storage medium and has stored various types of programs. In place of the ROM 950, any hard disc may be utilized.

RAM 960 provides a working area for various processors.

DMA controller 970 controls DMA transfer between the processors and memories (RAM, VRAM, ROM and the like).

CD drive 980 drives the CD (or information storage medium) 982 stored image and/or sound data and enables the access to these programs and data.

The communication interface 990 is one for performing data transfer between the game system and any external device through a network. In this case, the network connected to the communication interface 990 may be in any form such as communication line (analog telephone line or integrated services digital network (ISDN)), high-speed serial bus and so on. The communication line enables the data transfer through the Internet. The high-speed serial bus enables the data transfer between the game system of this embodiment and any other image generation system or game system.

The respective means of the present invention may be executed only by use of the hardware structure or only according to a program stored in an information storage medium or delivered through the communication interface. Alternatively, they may be executed both by the hardware and program.

Where the respective means of the present invention are to be executed both by the hardware and program, the information storage medium will store a program for executing these means utilizing the hardware. More particularly, this program instructs the processing to each of the processors 902, 904, 906, 910, 930 and so on which are hardware and also delivers data to them, if necessary. Each of these processors 902, 904, 906, 910, 930 and so on will execute the corresponding means of the present invention based on the instruction and delivered data.

Figure 9A:
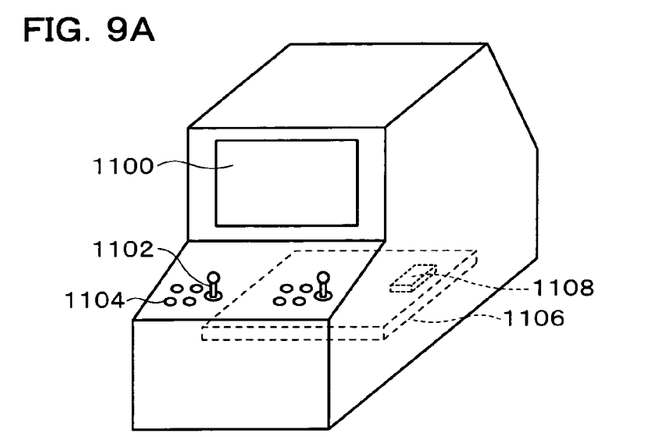
FIGS. 9A, 9B and 9C show various examples of systems to which the embodiment of the present invention can be applied.

FIG. 9A shows an arcade game system to which the present invention is applied. Players enjoy a game by manipulating levers 1102, buttons 1104 while viewing a game scene displayed on a display 1100. A system board (or circuit board) 1106 included in the game system comprises various processors and memories mounted therein. The system board 1106 includes an information storage medium or memory 1108 which has stored information (program or data) for executing the respective means of the present invention. These pieces of information will be referred to "the stored information pieces".

Figure 9B:
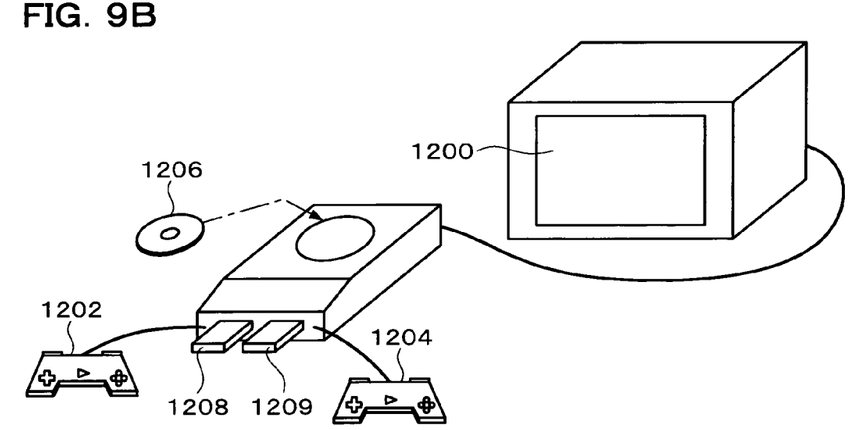

FIG. 9B shows a domestic game system to which this embodiment is applied. A player enjoys a game by manipulating game controllers 1202 and 1204 while viewing a game picture displayed on a display 1200. In such a case, the aforementioned stored information pieces have been stored in CD 1206 or memory cards 1208 and 1209 which are detachable information storage media in the game system.

Figure 9C:
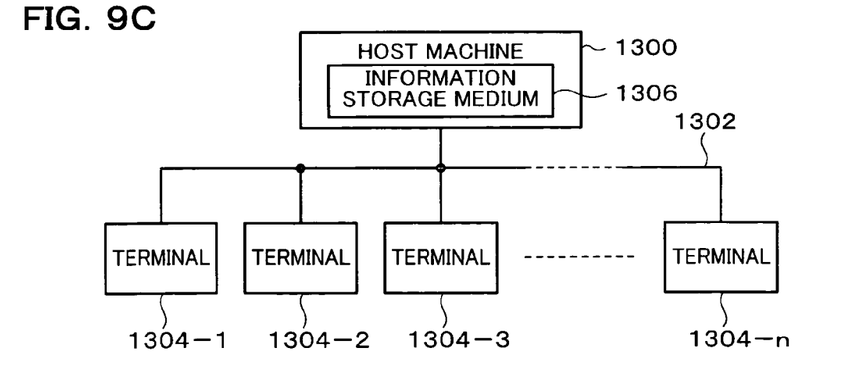

FIG. 9C shows an example wherein this embodiment is applied to a game system which includes a host machine 1300 and terminals 1304-1 to 1304-n connected to the host machine 1300 through a network (which is a small-scale network such as LAN or a global network such as the Internet) 1302. In such a case, the above stored information pieces have been stored in an information storage medium 1306 such as magnetic disk device, magnetic tape device, semiconductor memory or the like which can be controlled by the host machine 1300, for example. If the terminals 1304-1 to 1304-n are designed each to have a CPU, image generation IC and sound processing IC and to generate game images and game sounds in a stand-alone manner, the host machine 1300 delivers game program and other data for generating game images and game sounds to the terminals 1304-1 to 1304-n. On the other hand, if the game images and sounds cannot be generated by the terminals in the stand-alone manner, the host machine 1300 will generate the game images and sounds which are in turn transmitted to the terminals 1304-1 to 1304-n.

In the arrangement of FIG. 9C, the respective means of the present invention may be decentralized into the host machine (or server) and terminals. The above information pieces for realizing the respective means of the present invention may be distributed and stored into the information storage media of the host machine (or server) and terminals.

Each of the terminals connected to the network may be either of domestic or arcade type. When the arcade game systems are connected to the network, it is desirable that each of the arcade game systems includes a portable information storage device (memory card or portable game machine) which can transfer the information not only between arcade game systems but also between arcade game systems and domestic game systems.

The present invention is not limited to the things described in connection with the above forms, but may be carried out in any of various other forms.

For example, in the invention as defined in one dependent claim, part of the components in the independent claim to which the one dependent claim belongs may be omitted. Alternatively, the primary part of one independent claim may be dependent on any other independent claim.

Although it is desirable that the processings relating to the depth cueing and alpha value are as described in connection with FIG. 4, etc., the present invention is not limited to such processings, but may be carried out in any one of various other processings.

Furthermore, in the present invention (and particularly the invention of drawing the objects of which alpha values are varied sequentially from an object nearest to the viewpoint), the depth cueing process may be omitted with only the alpha value varying process for objects being executed.

The present invention may be applied to any of various games such as fighting games, shooting games, robot combat games, sports games, competition games, role-playing games, music playing games, dancing games and so on, other than the racing game.

Furthermore, the present invention can be applied to various game systems such as arcade game systems, domestic game systems, large-scale attraction in which many players can participate, simulators, multimedia terminals, image generation systems, and system boards that create game images.

The invention claimed is:

1. An image generation system comprising:
a memory which stores a program and data for image generating; and
at least one processor device which is connected to the memory and performs processing for image generating, the processor device performing:
depth cueing only for an object positioned within a depth cueing volume such that the color of the object being more distant from a viewpoint is made closer to a target color, the depth cueing volume being defined as a partial subset of a viewing volume based on a position of the viewpoint and includes a backward clipping plane of the viewing volume;
varying an alpha ($\alpha$) value of the object on condition that the object is positioned within the depth cueing volume so that the object being more distant from the viewpoint becomes more transparent;
varying a depth cueing value for each vertex of the object based on a Z-value for each vertex of the object;
varying the alpha value for each vertex of the object based on the Z-value for each vertex of the object;
sorting objects within the depth cueing volume so that the objects are drawn in succession starting from an object nearest to the viewpoint; and
drawing an image viewable from a virtual camera in an object space in drawing order determined by the sorting processing while performing hidden-surface erasing based on a Z-buffer process for the objects within the depth cueing volume,
wherein the processor device performs processing so that the depth cueing value increases based on an increase in the Z-value, the depth cueing value being a parameter for determining the strength of a depth cueing effect that results in the color of the object being brought closer to the target color as the Z-value increases.

2. The image generation system as defined in claim 1, the processor device further performing:
drawing a most distant background including a color different from the target color.

3. A non-transitory computer readable information storage medium encoded with a computer program, the computer program comprising a processing routine for implementing:
depth cueing only for an object positioned within a depth cueing volume such that the color of the object being more distant from a viewpoint is made closer to a target color, the depth cueing volume being defined as a partial subset of a viewing volume based on a position of the viewpoint and includes a backward clipping plane of the viewing volume;
varying an alpha ($\alpha$) value of the object on condition that the object is positioned within the depth cueing volume so that the object being more distant from the viewpoint becomes more transparent;
varying a depth cueing value for each vertex of the object based on a Z-value for each vertex of the object;
varying the alpha value for each vertex of the object based on the Z-value for each vertex of the object;
sorting objects within the depth cueing volume so that the objects are drawn in succession starting from an object nearest to the viewpoint; and
drawing an image viewable from a virtual camera in an object space in drawing order determined by the sorting processing while performing hidden-surface erasing based on a Z-buffer process for the objects within the depth cueing volume,
wherein the processing routine performs processing so that the depth cueing value increases based on an increase in the Z-value, the depth cueing value being a parameter for determining the strength of a depth cueing effect that results in the color of the object being brought closer to the target color as the Z-value increases.

4. The computer readable information storage medium as defined in claim 3, further comprising a processing routine for implementing:
drawing a most distant background including a color different from the target color.

5. An image generation method, performed by an image generation system having a processor device, comprising:
depth cueing only for an object positioned within a depth cueing volume such that the color of the object being more distant from a viewpoint is made closer to a target color, the depth cueing volume being defined as a partial subset of a viewing volume based on a position of the viewpoint and includes a backward clipping plane of the viewing volume;
varying an alpha ($\alpha$) value of the object on condition that the object is positioned within the depth cueing volume so that the object being more distant from the viewpoint becomes more transparent;
varying a depth cueing value for each vertex of the object based on a Z-value for each vertex of the object;
varying the alpha value for each vertex of the object based on the Z-value for each vertex of the object;
sorting objects within the depth cueing area so that the objects are drawn in succession starting from an object nearest to the viewpoint; and
drawing an image viewable from a virtual camera in an object space in drawing order determined by the sorting processing while performing hidden-surface erasing based on a Z-buffer process for the objects within the depth cueing volume,
wherein the depth cueing value increases based on an increase in the Z-value, the depth cueing value being a parameter for determining the strength of a depth cueing effect that results in the color of the object being brought closer to the target color as the Z-value increases, and the depth cueing, sorting and drawing steps are performed by the processor device.

6. The image generation method as defined in claim 5, further comprising:
drawing a most distant background including a color different from the target color.

* * * * *